United States Patent
Dingle

(10) Patent No.: US 7,243,862 B2
(45) Date of Patent: Jul. 17, 2007

(54) APPARATUS AND METHOD FOR MODE-SWITCHING FUEL INJECTOR NOZZLE

(75) Inventor: Philip J. G. Dingle, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 188 days.

(21) Appl. No.: 11/027,796

(22) Filed: Dec. 30, 2004

(65) Prior Publication Data

US 2005/0224606 A1    Oct. 13, 2005

Related U.S. Application Data

(63) Continuation-in-part of application No. 10/819,586, filed on Apr. 7, 2004.

(51) Int. Cl.
*F02M 39/00* (2006.01)
*F02M 41/00* (2006.01)
*F02M 59/00* (2006.01)
*F02M 61/00* (2006.01)
*F02M 67/02* (2006.01)
*B05B 7/10* (2006.01)

(52) U.S. Cl. .............. 239/533.2; 239/533.12; 239/533.3; 239/88; 239/406; 239/408

(58) Field of Classification Search .......... 239/533.2, 239/533.12, 533.14, 533.3, 585.1–585.5, 239/88–93, 398, 406, 418, 5.8
See application file for complete search history.

(56) References Cited

U.S. PATENT DOCUMENTS

| | | | |
|---|---|---|---|
| 4,699,323 A * | 10/1987 | Rush et al. | 239/544 |
| 5,540,200 A | 7/1996 | Naitoh et al. | 123/299 |
| 6,102,299 A * | 8/2000 | Pace et al. | 239/5 |
| 6,260,775 B1 | 7/2001 | Lambert et al. | 239/533.3 |
| 6,308,671 B1 | 10/2001 | Reed et al. | 123/90.15 |
| 6,431,469 B2 | 8/2002 | Lambert et al. | 239/533.3 |
| 6,467,702 B1 | 10/2002 | Lambert et al. | 239/533.12 |
| 6,513,487 B1 | 2/2003 | Jorach et al. | |
| 6,513,733 B1 | 2/2003 | Lambert | 239/533.1 |
| 6,601,566 B2 | 8/2003 | Gillis et al. | 123/468 |
| 6,616,070 B1 | 9/2003 | Kunkulagunta | 239/533.12 |

(Continued)

FOREIGN PATENT DOCUMENTS

EP    0967382 A2    12/1999

(Continued)

OTHER PUBLICATIONS

European Search Report dated Mar. 23, 2006.

(Continued)

*Primary Examiner*—Davis D. Hwu
(74) *Attorney, Agent, or Firm*—David P. Wood

(57) ABSTRACT

A fuel injector nozzle and method for dispersing fuel during a normal combustion operation and a supplemental combustion operation, the fuel injector nozzle comprising: a plurality of first outlet openings configured to disperse fuel in a first arrangement; and a plurality of second outlet openings configured to collide with the fuel passing through the plurality of first openings to disperse fuel in a second arrangement, wherein either the first or second arrangement is selected by the position of the piston.

29 Claims, 8 Drawing Sheets

U.S. PATENT DOCUMENTS

| | | | |
|---|---|---|---|
| 6,640,621 B2 | 11/2003 | Ward et al. | 73/118.2 |
| 6,679,108 B2 | 1/2004 | Robertson et al. | 73/117.3 |
| 6,679,225 B2 | 1/2004 | Robertson et al. | 123/436 |
| 6,758,407 B1 | 7/2004 | Lambert et al. | 239/5 |
| 6,857,417 B2* | 2/2005 | Niwa | 123/467 |
| 2003/0116120 A1 | 6/2003 | Agama et al. | 123/254 |
| 2003/0234006 A1 | 12/2003 | Saito et al. | 123/467 |
| 2005/0098144 A1 | 5/2005 | Stewart et al. | |

FOREIGN PATENT DOCUMENTS

| | | |
|---|---|---|
| EP | 1050676 A2 | 11/2000 |
| EP | 1275953 A2 | 1/2003 |
| EP | 1291516 | 3/2003 |
| JP | 08/254123 | 2/1997 |
| WO | WO 02/084110 | 10/2002 |
| WO | WO 2005/001255 | 1/2005 |

OTHER PUBLICATIONS

Automotive Industries, *Injection Hurtles Forward* by Jonathan Walker, Nov. 2003 5 pp.

Yoshinori Iwabuchi, Kenji Kawai, Takeshi Shoji and Yoshinaka Takeda, Trial of New Concept Diesel Combustion System-Premixed Compression-Ignited Combustion-, Reprinted from : Process of Diesel Engine Combustion (SP-1444), Mitsubishi Motors Corporation , 1999, pp. 1-10.

* cited by examiner

APPARATUS AND METHOD FOR MODE-SWITCHING FUEL INJECTOR NOZZLE

CROSS REFERENCE TO RELATED APPLICATIONS

This application is a continuation-in-part of U.S. patent application Ser. No. 10/819,586 filed: Apr. 7, 2004 the contents of which are incorporated herein by reference thereto.

TECHNICAL FIELD

Exemplary embodiments of the present invention are related to an apparatus and method for providing variable spray geometries and flow rates for specific conditions.

BACKGROUND

Environmental legislation is driving the exhaust emissions of internal combustion engines down towards zero emissions. To date, diesel engines have largely managed to achieve the present regulatory standards without the aid of exhaust gas after treatment (EGA) however, future standards are intended to drive the use of EGA, wherein emission levels are further reduced. Currently, EGA technologies are being developed, but their installed cost, space claim, reductant requirements, deterioration factors, calibration issues, and other negative aspects continue to make the pursuit of minimized engine-out emissions a high-value endeavour.

Typical fuel injector nozzles are configured such that fuel spray pattern, fuel atomization and fuel/air mixing are optimized for combustion during the most prevalent engine operating condition (e.g., normal Compression Ignition (CI) operation) however, EGA technologies and other emission reduction technologies require the fuel injector nozzles to operate at in-cylinder conditions untypical of normal operation. Thus, fuel injector nozzles are currently not adaptable to provide optimized fuel spray patterns, fuel flow rates, fuel atomization and fuel/air mixtures of varying degrees for both "normal operation" and operations associated with non-traditional emission reduction cycles.

Therefore, it is desirable to provide an apparatus and method for providing fuel to the cylinder in a variety of conditions, which may include normal operation and operations associated with non-traditional emissions reduction cycles.

SUMMARY OF THE INVENTION

The above discussed problems are overcome or alleviated by providing a fuel injector nozzle for dispersing fuel during a normal combustion operation and a supplemental combustion operation, the fuel injector nozzle comprising: a plurality of first outlet openings configured to disperse fuel during both homogeneous charge compression ignition (HCCI) and non-homogeneous charge compression ignition; and a plurality of second outlet openings configured to disperse fuel only during non-homogeneous charge compression ignition, wherein fuel dispersed from the plurality of second outlet openings collides with fuel dispersed from the plurality of first outlet openings, and in so doing terminates the spray plume development and trajectory of the first outlet fuel dispersion.

In another exemplary embodiment, a fuel injector nozzle for dispersing fuel in a cylinder of an internal combustion engine is provided. The nozzle disperses fuel when the cylinder is at or about top dead center and at or about bottom dead center, the fuel injector nozzle comprising: a plurality of first outlet openings configured to disperse fuel when the cylinder is at or about bottom dead center and when the cylinder is at or about top dead center; a plurality of second outlet openings configured to disperse fuel only when the cylinder is at or about top dead center, wherein fuel dispersed from the plurality of second outlet openings collides with fuel dispersed from the plurality of first outlet openings.

In yet another exemplary embodiment, a fuel injector for dispersing fuel into a swirl chamber or pre-combustion chamber of a divided-chamber engine is provided. Here only one pair of openings is provided in the nozzle, the first opening being used for non-traditional cycles as described above, and also for cold starting and light load operation in which fuel is dispersed into the center of the pre-chamber where the air is hottest. Fuel from the second opening is dispersed to that part of the pre-chamber with high velocity air motion, and in the process the second spray inhibits penetration of the first spray.

A method for providing variable fuel dispersal through a fuel injector nozzle is provided. The method comprising: providing a first plurality of openings in an outer housing of the fuel injector nozzle; providing a second plurality of openings in the outer housing of the fuel injector nozzle, the second plurality of openings being disposed below the first plurality of openings and the second plurality of openings are larger than the first plurality of openings such that a larger amount of fuel is allowed to flow therethrough; moving an outer needle from a first position to a second position in accordance with a first mode of dispersal of fuel through the fuel injector nozzle, wherein fuel under pressure is only allowed to flow through the first plurality of openings; and moving the outer needle from the second position to a third position in accordance with a second mode of dispersal of fuel through the fuel injector nozzle, wherein fuel under pressure is allowed to flow through the first plurality of openings and the second plurality of openings wherein fuel flowing through the second plurality of openings collides with fuel flowing through the first plurality of openings.

In yet another exemplary embodiment, a fuel injector nozzle and method for dispersing fuel during a normal combustion operation and a supplemental combustion operation of an engine is provided, the fuel injector nozzle comprises: a plurality of first outlet openings configured to disperse fuel in a first arrangement; and a plurality of second outlet openings configured to collide with the fuel passing through the plurality of first openings to disperse fuel in a second arrangement, wherein either the first or second arrangement is selected by the position of the piston of the engine.

The above discussed and other features and advantages will be appreciated and understood by those skilled in the art from the following detailed description and drawings.

DETAILED DESCRIPTION OF EXEMPLARY EMBODIMENTS

Figure 1:
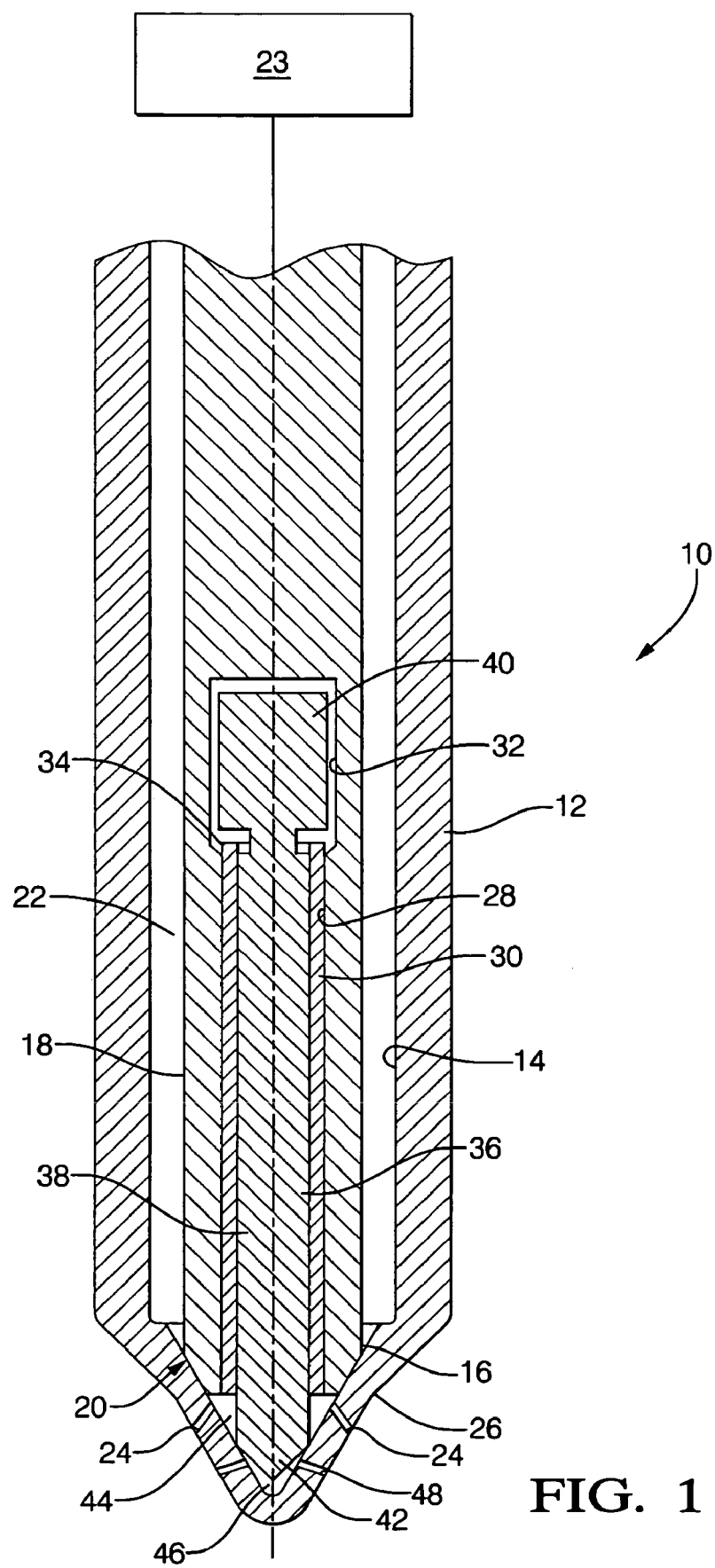
FIG. 1 is a cross-sectional view of fuel injector nozzle constructed in accordance with an exemplary embodiment of the present invention.

One exemplary embodiment of the present invention is to provide a fuel injector with a variable area nozzle that produces colliding sprays in one spray position optimized for normal diesel combustion and a non-colliding spray configuration wherein only a smaller set of opening are used for fuel dispersal wherein the spray geometry and flow rate is adapted for other emission technologies such as Homogeneous Charge Compression Ignition (HCCI) or injection of the fuel when the piston is at or near bottom dead center or any other position other than top dead center.

One in-cylinder emissions reduction technology is to operate the engine in a Homogeneous Charge Compression Ignition (HCCI) mode at light engine loads where exhaust temperatures are too low for effective exhaust catalyst operation and then have the engine operate in a conventional diesel combustion mode for medium to high loads, in conjunction with EGA. HCCI has been demonstrated to deliver very low engine-out emissions of NOx and PM at a respectable sfc efficiency however, HCCI is currently constrained to light load operation due to a lack of available control parameters. HCCI is a low-temperature combustion mode which takes place spontaneously and homogeneously without flame propagation.

The strategy of adopting HCCI at light loads, particularly on heavy duty applications, is expected to provide a valuable contribution to the total package of technologies necessary for emission reduction. Other EGA technologies may include Lean NOx Trap, and Diesel Particulate Trap as examples that may require late post-injections for regenerative purposes.

An effective deployment of HCCI technology as proposed herein, requires an injection of fuel into the cylinder during the intake or compression stroke to achieve a near homogeneous mixture. However, because of the low air density extant at that point in the cycle, and because a conventional injector has typically been optimized for operation at high pressures, there is a possibility of fuel impinging on the exposed cylinder walls, leading to unacceptable engine wear rates. Essentially the same situation exists in the case where a late post injection is required for EGA regeneration.

As disclosed herein exemplary embodiments of the present invention propose a solution to this problem through the felicitous combination of two technologies namely, selectable spray hole geometry of an injection nozzle and fuel dispersal through colliding sprays. Typically, the spray hole geometry of an injector nozzle for a direct injection (DI) diesel engine is optimized to achieve the best possible dispersion of fuel for conventional diesel combustion within the constraints of combustion chamber configuration and fuel injection equipment (FIE) hydraulic performance. The drive for cost effective exhaust emission reduction places new demands upon the existing FIE, requiring it to adapt as necessary. At this time, engine original equipment manufactures (OEMs) would like the ability for supplementary injections of fuel in-cylinder both well before, and well after the conventional timing of injection which normally occurs close to "top dead center" (TDC).

For light load HCCI operation, an injection of fuel totaling perhaps one third that of the full load delivery quantity is required in a timing window that may coincide with the intake or compression stroke. For EGA trap regeneration, a similar quantity of fuel may need to be injected as a post-injection late in the expansion stroke or early exhaust stroke. The problem faced by these supplemental injection requirements is that the nozzle spray pattern and nozzle or nozzle openings, which has been optimized for diesel combustion, is not optimum for the early HCCI or the late post-injections.

These injections take place at points in the cycle when the air density is low, and the piston is far down the bore. Accordingly, and if the fuel is dispersed during this point via a nozzle opening configured for "normal diesel" combustion there is high probability that the injected fuel will impinge on the cylinder wall where it may wash away lubricant and also drain past the pistons into the sump. This unintended consequence can lead to excessive and undesirable engine wear.

One proposal to ameliorate this negative effect, is to execute these supplemental injections at a pressure very much lower than the main diesel combustion injection events, with the expectation that with lower spray momentum, less fuel will reach the cylinder wall and thus reduce the magnitude of the problem. To a large extent, this solution is dependant upon the capabilities of the FIE being considered since most systems are not capable of shot-to-shot pressure modulation. However, certainly in the case of early HCCI injection, very fine atomization is required to achieve the necessary near-homogeneous air/fuel mixture, and this would be difficult to achieve when injecting a relatively small amount of fuel, at low pressure, from a relatively high flow-area nozzle. An exemplary embodiment of the present invention addresses this issue.

As discussed herein, a more ideal solution would allow the supplemental injections to be made under conditions where a better match between injection pressure, nozzle flow area, and spray plume targeting occurs. An exemplary embodiment of the present invention combines the concept of a Variable Area Nozzle (VAN) or Variable Orifice Nozzle (VON) with colliding sprays. A variable area nozzle or variable orifice nozzle may use an inner and outer needle to control a lower and upper row of orifices respectively. Controlled partial lift of the nozzle needle (outer) exposes the upper row of holes, while full needle lift (outer and inner) exposes all holes. This approach requires close dynamic control of needle lift, which is possible with certain designs of three-way control valve, and also with piezo-electric actuators. In addition, the concept of impinging or colliding sprays is used as an aid to improve atomization, improve spray breakup and thus provide more rapid air entrainment prior to combustion as well as providing a means for influencing spray pattern.

In accordance with exemplary embodiments of the present invention, and for use in engines where supplemental injections are required (as outlined above) an injector for providing a variable area nozzle and colliding spray geometry is disclosed. In accordance with an exemplary embodiment, the nozzle will have a lower row of holes or openings and an upper row of holes or openings for selective dispersal therethrough. The lower holes may be conventionally located in the nozzle sac with a cone angle optimized for the main combustion system, or slightly greater. The upper row of holes will have the same number of holes and they will lie in the same axial plane as the lower holes. Alternatively, fewer upper holes are provided and the resulting lower holes which do not have a corresponding upper hole aligned therewith are drilled to provide a resulting plume that is either the same as the resultant of the colliding sprays or is configured for dispersement corresponding to a top dead center piston position.

However, the upper row of holes will be of significantly smaller diameter since the flow area is optimized for the supplemental injection flow rate. Furthermore, these holes enter the nozzle at the upper seat area and will have a much narrower cone angle. Specifically, the cone angle will have been selected to minimize the likelihood of spray/wall impingement under the cylinder conditions extant during the supplemental injection event. An example of such a cone angle is in the range of 60 to 120 degrees with an exemplary angle of 70 degrees. Of course, it is understood that this angle may vary to degrees outside the aforementioned range as it is understood the angle depends on the cylinder dimensions, the flow rate, flow opening size and pressure and location of the nozzle within the cylinder chamber. It is also understood that the angle should be in a range to avoid impingement of the fuel on the cylinder walls during the supplemental injection event. Where possible, both upper and lower rows of holes will enter the nozzle body in Valve Covers Orifice (VCO) format so that hydrocarbon emissions originating from the nozzle sac or sacs will be minimized.

In accordance with an alternative exemplary embodiment and as applications may require (e.g., engine applications), the size of the upper and lower holes will be the same such that flow through these openings will be the same or substantially the same and the upper and lower holes will each have a different angular configuration with respect to the nozzle, wherein the resulting spray plume from both of the upper and lower holes will have an angular configuration that is one half the difference between the angular configuration of both the upper and lower holes.

In one mode of operation and when an early HCCI injection is required, partial lift of the nozzle needle is commanded. In this mode, the outer needle lifts to uncover the upper orifices and a long duration, high-pressure injection commences. Alternatively, multiple shorter duration injections are possible if desired. The plume is well atomized due to the high pressure and optimum flow area, and there is a long free plume length to the nearest impingement surface. This behavior offers superior opportunity for the air/fuel mixing necessary to achieve homogeneity given the low air density prevailing in-cylinder at this point in the cycle. A similar event occurs under late (far) post injection conditions.

In another mode of operation and when a close pilot injection is demanded in a conventional diesel combustion event only the upper orifices are used. Here the very small quantity of fuel delivered through the upper orifices will be better controlled than usual today since it is being discharged through a smaller flow area and it is also being directed closer to the center of the combustion chamber where the air is hotter and more amenable to combustion initiation.

For main injection event near TDC, full needle lift is commanded, where the rapid needle acceleration obtained from modern FIE means that very little fuel will emanate from the upper holes potentially aimed at the piston, before these plumes are overwhelmed by the main spray plumes (e.g., lower holes with larger openings). At this point, the colliding sprays of the main plume (lower holes) and the supplementary plumes (upper holes) are expected to enhance atomization and spray disintegration beyond that obtainable from the main sprays alone. Some downward deflection and steering of the main spray may be evident from the collision, which should be considered in the main spray targeting. Again, at the end of main injection, rapid needle closure will minimize the over spray from the supplementary holes between the time that the inner and outer needles reach their respective seats. However, this design will be less sensitive than conventional systems to end of injection conditions since they will be spraying into an under utilized part of the combustion chamber through smaller than normal injection holes, at a time when the piston is rapidly disappearing.

Referring now to FIG. 1, a cross sectional view of a portion of a fuel injector 10 constructed in accordance with an exemplary embodiment of the present invention is illustrated. Fuel injector 10 comprises a nozzle body 12 provided with a blind bore 14 including, adjacent its blind end, a frusto-conical seating surface 16. A first, outer valve needle 18 is received for reciprocal movement within bore 14. First outer valve needle 18 is configured and arranged to have an exterior dimension or configuration to guide the first outer valve needle within the bore.

A distal end 20 of the first outer valve needle is configured for engagement with a portion of seating surface 16. This provides a valve covers orifice (VCO) geometry. In addition, the exterior dimension of the first outer valve needle is such that a chamber 22 is defined between first outer valve needle 18 and bore 14.

The configuration of distal end 20 and seating surface 16 allows first outer valve needle 18 to control fluid communication between chamber 22 and a plurality of first outlet openings 24 bored through a nozzle end 26 of nozzle body 12. As discussed above first outlet openings 24 will have a smaller diameter opening than the openings disposed below openings 24 and the angular configuration of openings 24 is adapted for supplemental injection requirements.

First outer valve needle 18 is also provided with a drilling or bore 28 within which a tubular sleeve 30 is received. As illustrated, tubular sleeve 30 does not extend to the end of drilling 28. Accordingly, sleeve 30 defines a passage having an interior region defined by sleeve 30. At the end of drilling 28 a larger sized region 32 is located.

A shoulder or step 34 is defined between drilling 28, sleeve 30 and region 32. A second, inner valve needle 36 is configured to be slidably received within the passage defined by sleeve 30 and region 32. Second inner valve needle 36 also comprises an elongated portion 38 configured to be slidably received within the passage defined by sleeve 30, and a larger portion 40 which is configured for movement within area 32 and engages step 34 to define a limit movement of the second inner valve needle within the first outer valve needle.

The second inner valve needle is configured at its distal end 42 for engagement with a lower portion of seating surface 16. In addition, the exterior dimensions of the second inner valve needle and the first outer valve needle is such that a chamber 44 is defined between first outer valve needle 18, second inner valve needle 36 and bore 14. In addition, the exterior dimensions of distal end 42 and the lower portion of inner bore 16 allows another chamber 46 to be defined therein.

The configuration of distal end 42 and seating surface 16 allows second inner valve needle 36 to control fluid communication between chamber 44 and a plurality of second outlet openings 48 bored through a nozzle end 26 of nozzle body 12. In an exemplary embodiment, openings 48 are disposed below openings 24 and as will be discussed herein are configured to have an alternative angular configuration with regard to nozzle end 26 as opposed to openings 24. Moreover, openings 48 each have a much larger diameter than openings 24 in order to permit a greater amount of fuel to pass therethrough for use in "normal" engine operations.

The assembly of the first and second inner valve needles is one embodiment accomplished by introducing the second inner valve into the boring of the first outer valve needle, and subsequently the tubular sleeve being inserted therein for assisting in retaining the second inner valve needle within the first outer valve needle. The tubular sleeve and area 32 provides an interference fit within the first outer valve needle, and a small clearance is defined between sleeve 30 and the inner valve needle 36 to permit fuel to flow to or from drilling 28, thus preventing the second inner valve needle 36 from becoming held in any particular position relative to the first outer valve needle due to the formation of a hydraulic lock.

In one mode of operation, fuel under high pressure is applied to chamber 22, and any suitable technique is used for controlling movement of the first outer valve needle 18 relative to the nozzle body 12. For example, the first outer valve needle may be held in engagement with the seating by the fluid pressure within chamber 22, the fluid pressure within the chamber being controlled by, for example, a piezoelectric actuator arrangement 23 acting upon an appropriate piston or needle valve. It will be appreciated, however, that alternative control arrangements may be used. For example, a solenoid may be positioned to provide the required linear movement to first outer valve needle 18. Any actuator capable of being controlled by a microprocessor or engine control module for providing linear movement to first outer valve needle 18 is contemplated to be within the scope of exemplary embodiments of the present invention.

It will be appreciated that when the first outer valve needle 18 is held in engagement with the valve seating, fuel is unable to flow from chamber 22 past the seating, thus fuel cannot be delivered through either the first outlet openings 24 or the second outlet openings 46. Other fuel injector nozzles are found in the following U.S. Pat. Nos. 6,260,775; 6,431,469; 6,467,702; 6,513,733; and 6,616,070, the contents of which are incorporated herein by reference thereto.

Figure 2:
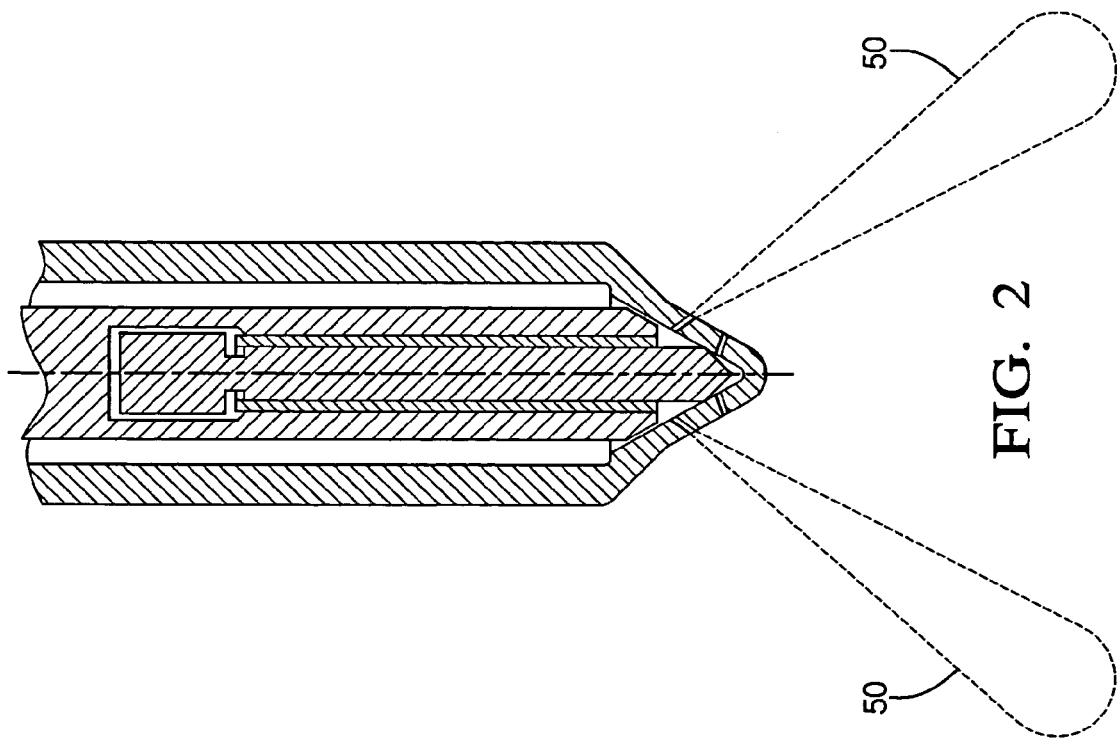
FIG. 2 is a cross-sectional view of fuel injector nozzle constructed in accordance with an exemplary embodiment of the present invention in a first mode of operation.

Referring now to FIG. 2 and in order to allow for fuel injection or dispersal from nozzle 10 in one mode of operation, the first outer valve must be lifted away from the valve seating. This movement permits fuel to flow through an opening defined between the distal end of the first outer valve and a portion of the seating surface, thus fuel is able to flow from chamber 22 through the first outlet openings 24. However, during this mode of operation, which corresponds to supplemental injection or early HCCI injection the limit of travel of first outer valve needle 18 is limited to a position such that openings 48 remained closed.

Movement of the first outer valve needle in order to effect this flow is of a distance not sufficient enough to cause portion 40 of the second inner valve needle to make contact with shoulder portion 34, thus movement of the first outer valve needle is not transmitted to the second inner valve needle. In this position and due to the configuration of the second inner valve needle and sleeve 30, fuel is able to flow between the second inner valve needle and sleeve 30 thereby, pressurizing the region 32 and applying a magnitude force to the portion 40 of the second inner valve needle thus, closing off openings 48 from area or chamber 44.

Figure 4:
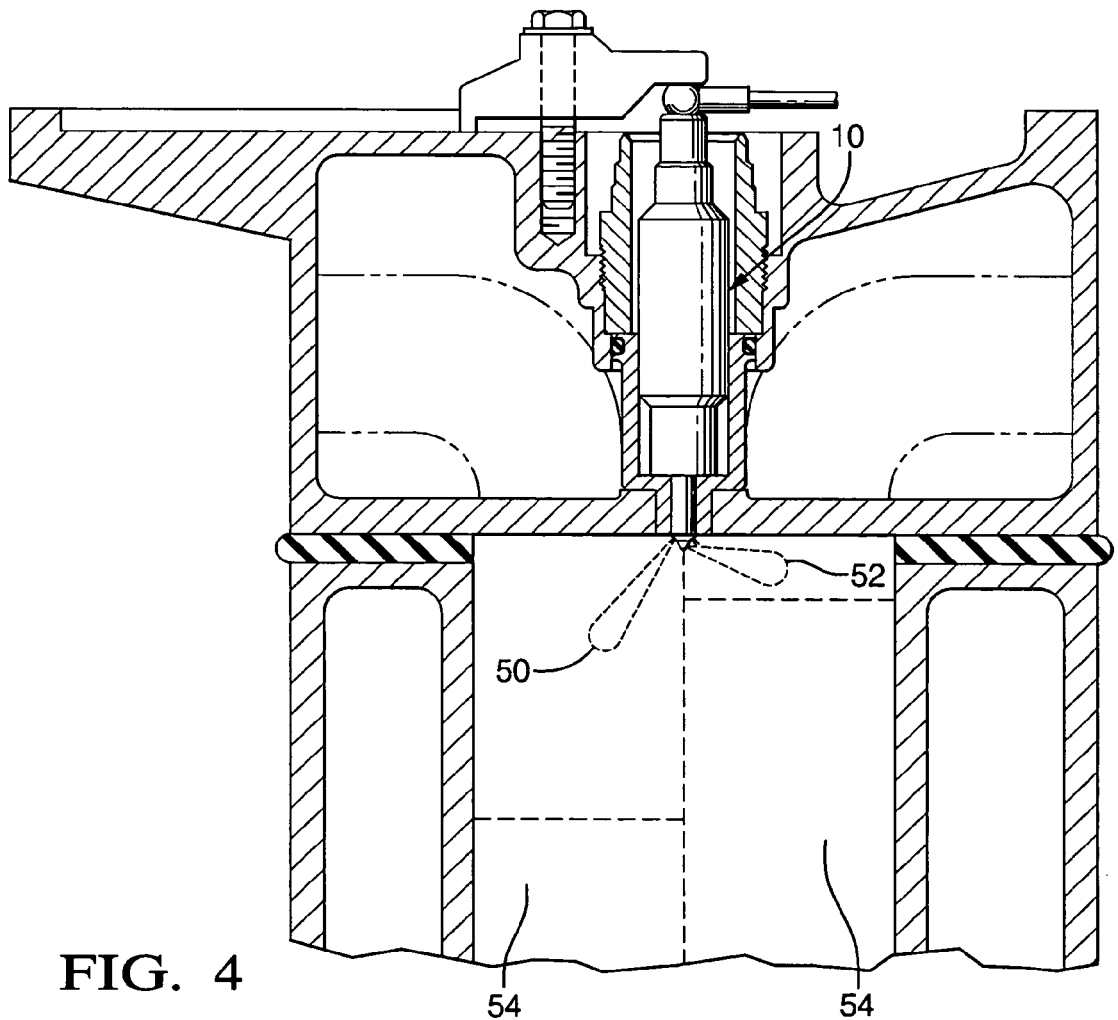
FIG. 4 is a partial cross-sectional view of a cylinder head with a fuel injector nozzle illustrating modes of operation in accordance with exemplary embodiments of the present invention.

As discussed above this operational mode corresponds to an engine condition when an early HCCI injection is required and partial lift of the nozzle needle is commanded. In this mode, the outer needle lifts to uncover the upper openings and a long duration, high pressure injection commences. Plume 50 illustrates this mode of operation. The plume is well atomized due to the high pressure and optimum flow area, and there is a long free plume length to the nearest impingement surface. This behavior offers superior opportunity for the air/fuel mixing necessary to achieve homogeneity given the low air density prevailing in-cylinder at this point in the cycle. A similar event occurs under late (far) post injection conditions. FIG. 4 also illustrates the plume and piston location during this mode of operation.

Accordingly, fuel is only delivered through the first outlet openings 24 and it will be appreciated that in this position the second inner valve needle 36 does not lift from the valve seating. In addition, the slightly reduced fuel pressure acting upon the lower end of the needle 20 due to the flow of fuel through the first openings and due to the throttling effect of the second inner valve needle and the seating will result in the second inner valve needle moving into engagement with the seating due to the pressure of the fuel acting upon the larger portion 40 of the second inner valve needle.

Figure 3:
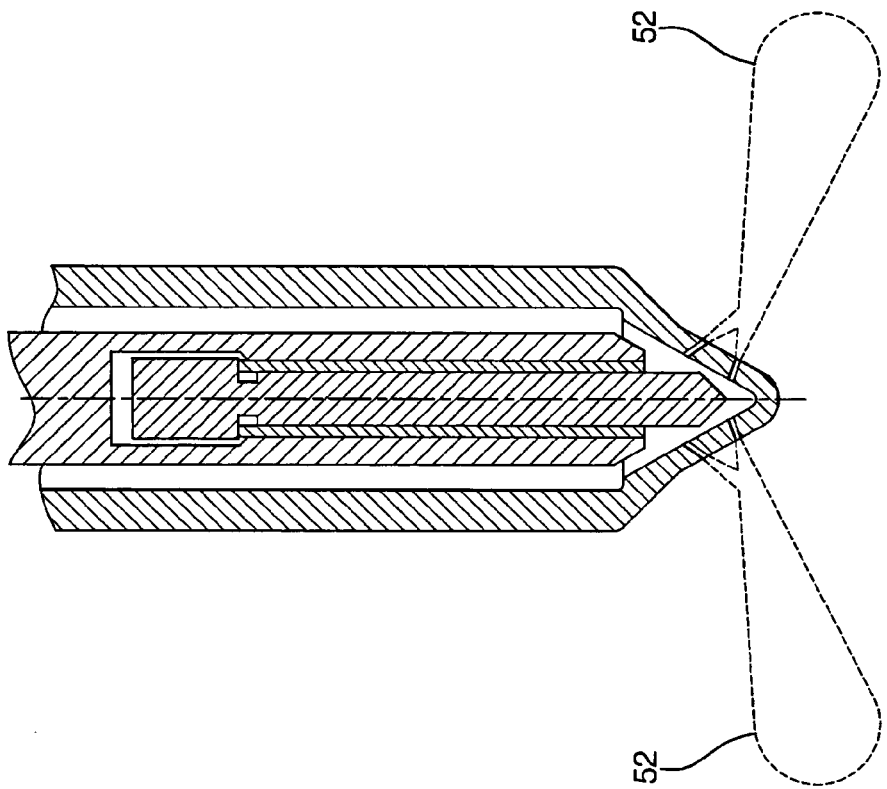
FIG. 3 is a cross-sectional view of fuel injector nozzle constructed in accordance with an exemplary embodiment of the present invention in a second mode of operation.

Referring now to FIG. 3 and in order to allow for fuel injection or dispersal from nozzle 10 in another mode of operation, the first outer valve must be lifted away from seating 16 a further distance. In this position, shoulder 34 makes contact with portion 40 of the second inner valve needle, and further movement of the first outer valve needle will result in the second needle being lifted from the seating. This movement permits fuel to flow through a passage defined between distal end 42 and a portion of valve seating 16, wherein fuel is allowed to flow through openings 48. Accordingly, fuel is injected through both the first and second outlet openings and due to the different angular configurations of these openings colliding of the fuel occurs at a position outside of the nozzle end. It will be appreciated that since openings 48 are larger than openings 24 the plume having a higher flow rate will collide with and direct the plume of openings 24. The corresponding plume 52 is optimized for fuel dispersal and atomization for "normal" engine operation when the piston is much closer to the fuel injector.

Figure 8:
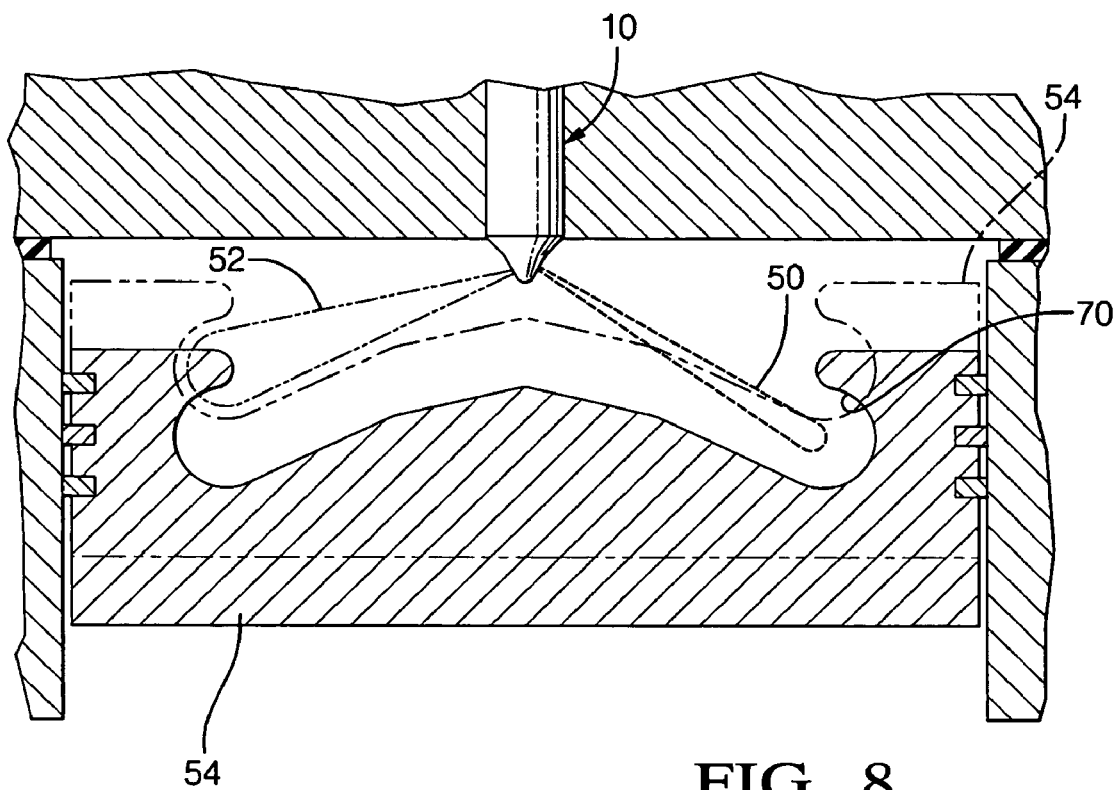
FIG. 8 is a partial cross-sectional view of a cylinder head with a fuel injector nozzle illustrating modes of operation in accordance with exemplary embodiments of the present invention.

As discussed above with reference to an engine condition when a close pilot injection is demanded, the very small quantity of fuel through openings 24 will be better controlled than usual since it is being discharged through a smaller flow area and it is also being directed closer to the center of the combustion chamber where the air is hotter and more amenable to combustion initiation. For a main injection event near TDC, full needle lift is commanded, where the rapid needle acceleration obtained from modern FIE means that very little fuel will emanate from the upper holes potentially aimed at the piston, before these plumes are overwhelmed by the main spray plumes. At this point, the colliding sprays of the main plume and the supplementary plumes are expected to enhance atomization and spray disintegration beyond that obtainable from the main sprays alone. Some downward deflection and steering of the main spray may be evident from the collision, which should be considered in the main spray targeting. Again, at the end of main injection, rapid needle closure will minimize the over spray from the supplementary holes between the time that the inner and outer needles reach their respective seats. It is also expected that this design will be less sensitive to end-of-injection conditions since they will be spraying into an under utilized part of the combustion chamber through smaller than normal injection holes, at a time when the piston is rapidly disappearing. Thus, exemplary embodiments of the present invention offer a fuel injector that provides unique spray modes not found in conventional systems. FIG. 4 also illustrates plume 52 and piston location during this mode of operation. It is noted that a piston 54 is illustrated in FIG. 4 wherein only half of the piston is shown for supplemental spray mode and only half a shown for the colliding spray mode. It is also understood that the surface of the piston may be configured to have a re-entrant bowl or other cavity configuration disposed on the surface of the piston. (See for example FIGS. 8-10). As illustrated in FIG. 8, the mode switching nozzle of exemplary embodiments of the present invention allows the same to provide a plume (50, 52) that corresponds to the position of the piston. For example, the 10 degrees and 30 degrees after top dead center illustrated in FIG. 8. Of course, it is understand that exemplary embodiments of the present invention may be used for any piston position and not just those illustrated in FIG. 8.

Figure 5:
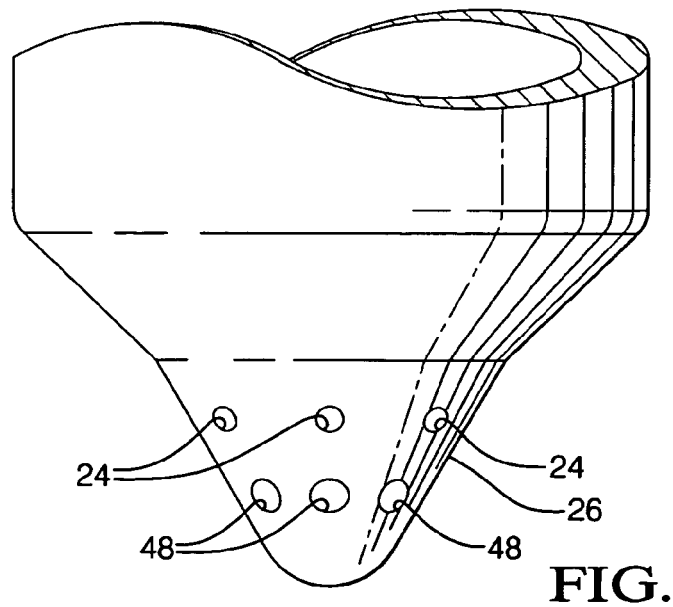
FIG. 5 is an exterior view of a portion of a fuel injector nozzle constructed in accordance with an exemplary embodiment of the present invention.

Referring now to FIG. 5 an enlarged portion of nozzle end 26 is illustrated. As shown, and in accordance with an exemplary embodiment of openings 24 are aligned to be disposed above openings 48 such that in colliding spray mode (FIG. 3) the fuel dispersing through the larger openings of openings 48 will collide with and redirect the fuel dispersing out of the smaller openings 24. It is contemplated that in one embodiment the center of openings 24 will be aligned with the center of openings 48 however, is also understood that the centers of smaller openings 24 may be slightly offset from the centers of larger openings 48 while still achieving the same colliding effect as a greater amount of fuel is flowing through openings 48.

In accordance with an exemplary embodiment the diameter of openings 24 is 0.011 mm and the diameter of openings 48 is 0.016 mm. It is, of course, understood that exemplary embodiment of the present invention are intended to include dimensions greater than or less than the aforementioned values. In addition, and in accordance with an exemplary embodiment, the number of openings 48 will be the same as the number of openings 24. However, in an alternative exemplary embodiment, and wherein the positioning and size of openings 48 allows the same to collide with fuel from more than one opening 24, the number of openings 48 may be less than the number of openings 24. Likewise the number of openings 24 may be less than the number of openings 48, but in all cases an opening 48 will be paired with an opening 24 as they may exist.

In accordance with an exemplary embodiment, the resulting colliding spray angle with respect to the centerline of nozzle 26 is in the range of 60-120 degrees with an exemplary angle of 70 degrees. Of course, it is understood that the present invention is intended to cover angles greater than or less than the aforementioned values as long as the proper fuel dispersal is achieved, which will relate to cylinder dimensions, nozzle end configurations and the actual location of the nozzle within the cylinder.

Figure 6:
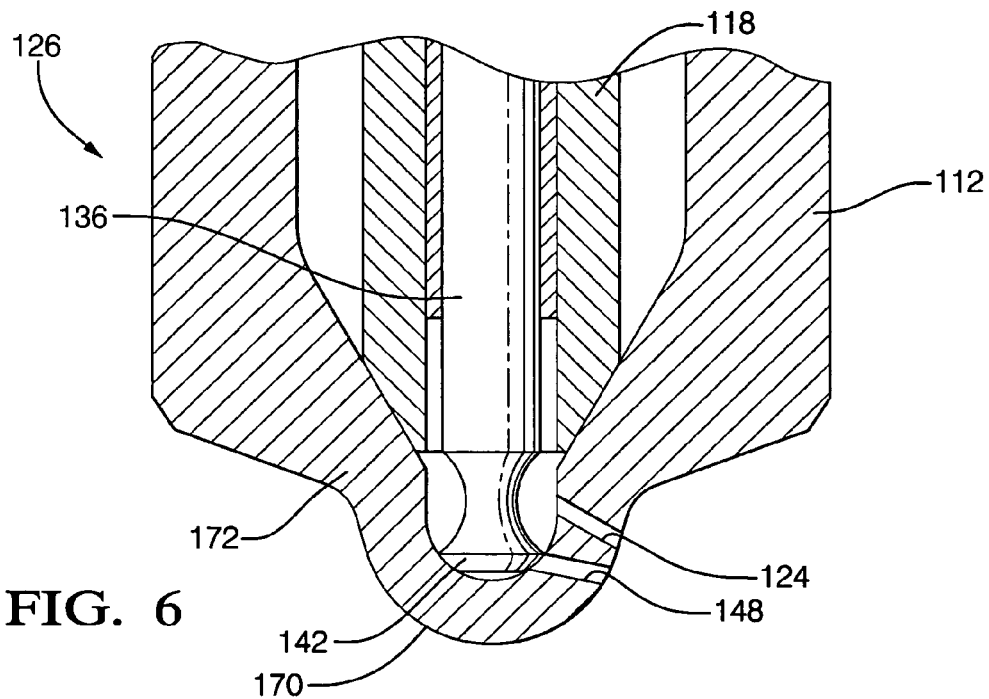
FIG. 6 is a cross-sectional view of a portion of a fuel injector nozzle constructed in accordance with an alternative exemplary embodiment of the present invention.

Referring now to FIG. 6, an alternative exemplary embodiment of the present invention is illustrated. In this embodiment, components performing similar analogous functions are labeled in multiples of 100. Here nozzle end 126 comprises a bulbous tip portion 170 and both openings 124 and 148 are located within a wall portion 172 of tip portion 170. In addition, operation of outer valve needle 118 and inner valve needle 136 is similar to that described in the other embodiment's however, distal end 142 of inner valve needle 136 has an exterior configuration which allows fuel to flow through openings 124 while distal end 142 is still seated within the cavity defined by bulbous tip portion 170 (e.g., upward movement of the outer needle 118 without upward movement of inner valve needle 136). Distal end 142 is configured such that as it is raised upwardly both openings 124 and 148 will be able to receive the supplied fuel.

Figure 7:
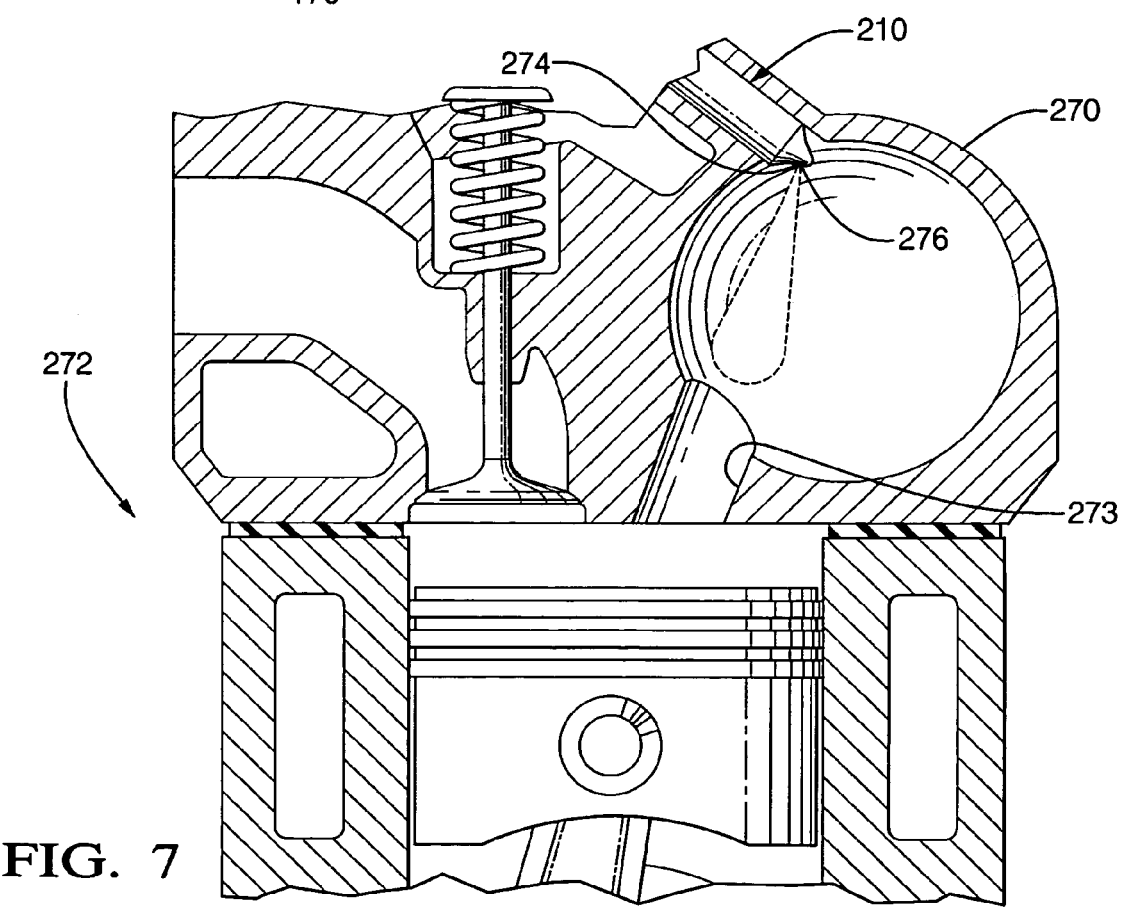
FIG. 7 is a cross-sectional view of a swirl chamber for use in an indirect injection engine or process in accordance with an alternative exemplary embodiment of the present invention.

In yet another exemplary embodiment, and referring now to FIG. 7, a fuel injector 210 for dispersing fuel into a swirl chamber or pre-combustion chamber 270 of a cylinder 272 of a divided-chamber engine is provided. This embodiment is contemplated for use in an indirect-injection (IDI) wherein fuel is injected into a small pre-chamber connected to the cylinder via a narrow passage 273 or alternatively a direct-injection engine (e.g., opposed-piston 2-strokes), wherein the injector is disposed in a side wall of the cylinder head. Here only one pair of openings 274, 276 is provided in the nozzle for dispersement into the prechamber. The first opening 274 is used for non-traditional cycles as described above, and also for cold starting and light load operation in which fuel is dispersed into the center of the pre-chamber where the air is hottest. Fuel from the second opening 276 is dispersed to that part of the pre-chamber with high velocity air motion, and in the process the second spray inhibits penetration of the first spray due to the colliding of the spray plumes. As in the previous embodiments the openings are aligned with each other such that the plumes of both openings 274 and 276 collide with each other. Typically, the nozzle is arranged so that the fuel is dispersed opposite to the air swirl in the swirl chamber however, it is also contemplated that the fuel can be disposed in the same direction as the air swirl.

Swirl chambers are used in both divided-chamber (IDI) engines (e.g. Ricardo "Comet", see FIG. 10), and also direct-injection engines (e.g., opposed-piston 2-strokes, wherein the injector is disposed in a side wall of the cylinder head as opposed to the top (see the dashed lines in FIG. 4), and they employ high velocity air swirl and typically only a single fuel-spray plume to achieve the necessary air/fuel mixing. With such designs, the swirling air looses heat to the chamber walls, so that the air most amenable to ignite the initial fuel spray is in the center of the chamber since that is the hottest location.

Since in the interests of minimizing noise, NOx, and HC emissions it is desired to have a short ignition delay, then ideally at the time of injection fuel would be directed to the center of the chamber first to achieve ignition (e.g., first opening 274) and then to the periphery later where most of the air remains (e.g., first opening 274 and second opening 276). This ideal is not possible with conventional nozzles but is possible with the mode switching nozzle of exemplary embodiments of the present invention. Since the nozzle enters the chamber from the side, only one pair of injection holes can be deployed as opposed to multiple pairs for a centrally mounted nozzle as illustrated in other exemplary embodiments of the present invention.

In operation, the first stage lift of the nozzle needle exposes the first outlet hole which is of small diameter and directed toward the center of the combustion chamber. After a suitable fuel quantity has been injected, the needle may move to the second stage of lift whereby the second outlet is exposed causing the main plume to be directed to that part of the chamber with the highest air swirl (illustrated by the arrow in FIG. 7), and in so doing, it subsumes the first spray plume.

Exemplary embodiments of the present invention relate to a fuel injector intended for use in delivering fuel under varying flow rates and spray geometries into varying combustion spaces of an internal combustion engine. The invention relates, in particular, to an injector of the inwardly opening type in which the number of outlet openings through which fuel is injected at any instant can be controlled by controlling the position of a valve needle, wherein one mode of operation causes a colliding spray between fuel flowing through two sets of outlets axially aligned yet having different angles with respect to the end portion of the nozzle.

Control of the fuel injector or movement of the needle valves may be achieved conveniently by means of an actuator arrangement for moving the valve needle between the first and second fuel injecting positions. The fuel injector only requires a single concentric valve needle assembly and is therefore relatively easy to manufacture and assemble.

In order to effect movement of an actuator for moving first outer valve needle, an engine control unit or engine control module comprising a microprocessor and required algorithm(s) is in communication with the actuator of the nozzle and plurality of sensors providing signals indicative of operating parameters, which when applied to a control algorithm of the engine control unit will cause an appropriate operating signal to be sent to the actuator of the nozzle thereby affecting the movement of the needle valve according to the piston location and ignition firing sequence.

In accordance with an exemplary embodiment, the processing of the above description may be implemented by a controller disposed internal, external, or internally and externally to an engine control unit (ECU). In addition, processing of the above may be implemented through a controller operating in response to a computer program which may incorporate physical based models. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

In accordance with an exemplary embodiment, processing may be implemented through a controller, engine control unit and/or a processing device operating in response to a computer program. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

Referring now to FIGS. 10-13, a control strategy for additional alternative exemplary embodiments of the present invention are illustrated. Although a single injector, piston and cylinder are shown it is, of course, understood that exemplary embodiments of the present invention are contemplated to be used with engines having various number of cylinders and injectors. In addition, it is also understood that exemplary embodiments are intended for diesel engines however, the present invention is not only limited to diesel engines and that exemplary embodiments are intended for any internal combustion engine requiring a fuel injector. In a conventional diesel engine, fuel is injected into the combustion chamber over a period extending for around 25 crank degrees at full load and commencing at a point usually close to TDC. At part load, the injection period will be shorter. Thus, fuel injection periods vary based in part by engine load therefore, it is desirable to provide an injector and control method that varies the fuel dispersement accordingly. Because diesel combustion is essentially a diffusion process in which the fuel is obliged to find and intimately mix with available oxygen in the combustion chamber, it is necessary to closely control both the injected fuel trajectory and the motion of the air so that they may be brought together for this purpose. Initially from the macro perspective there is liquid fuel and compression heated air but no prospect of ignition until they have thoroughly mixed. This critical mixing process proceeds continuously from the start of injection until the last remnant of fuel is consumed, and likewise combustion proceeds from the time that a parcel of fuel has mixed down to the molecular level such that the local air/fuel ratio is within the flammable range, and the necessary chemical reactions that precede ignition have occurred. Therefore, optimizing the diffusion process at varying loads and positions of the piston is desirable.

The skill in designing and developing a diesel combustion system is therefore in the many details of arranging for and managing this mixing process, and it is made more difficult by the continuously changing combustion space geometry resulting from piston motion.

Figure 9:
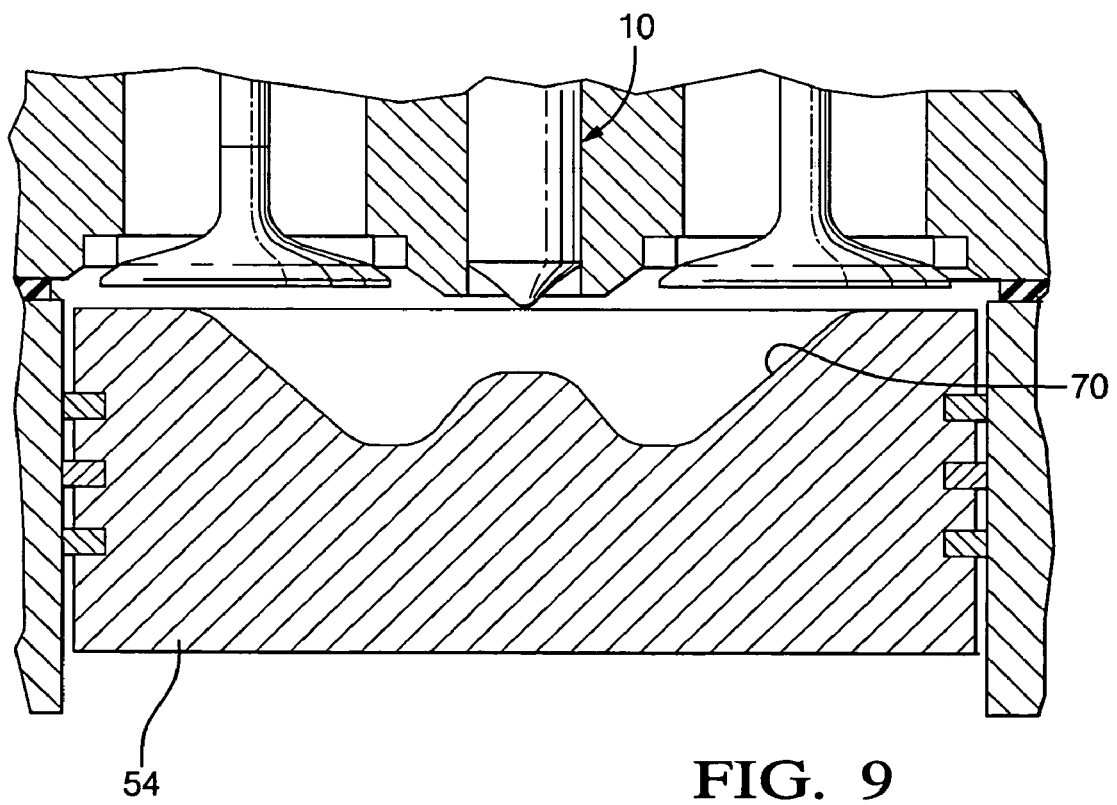
FIG. 9 is a cross-sectional view of an alternative piston configuration contemplated for use with the nozzle of exemplary embodiments of the present invention.
Figure 10:
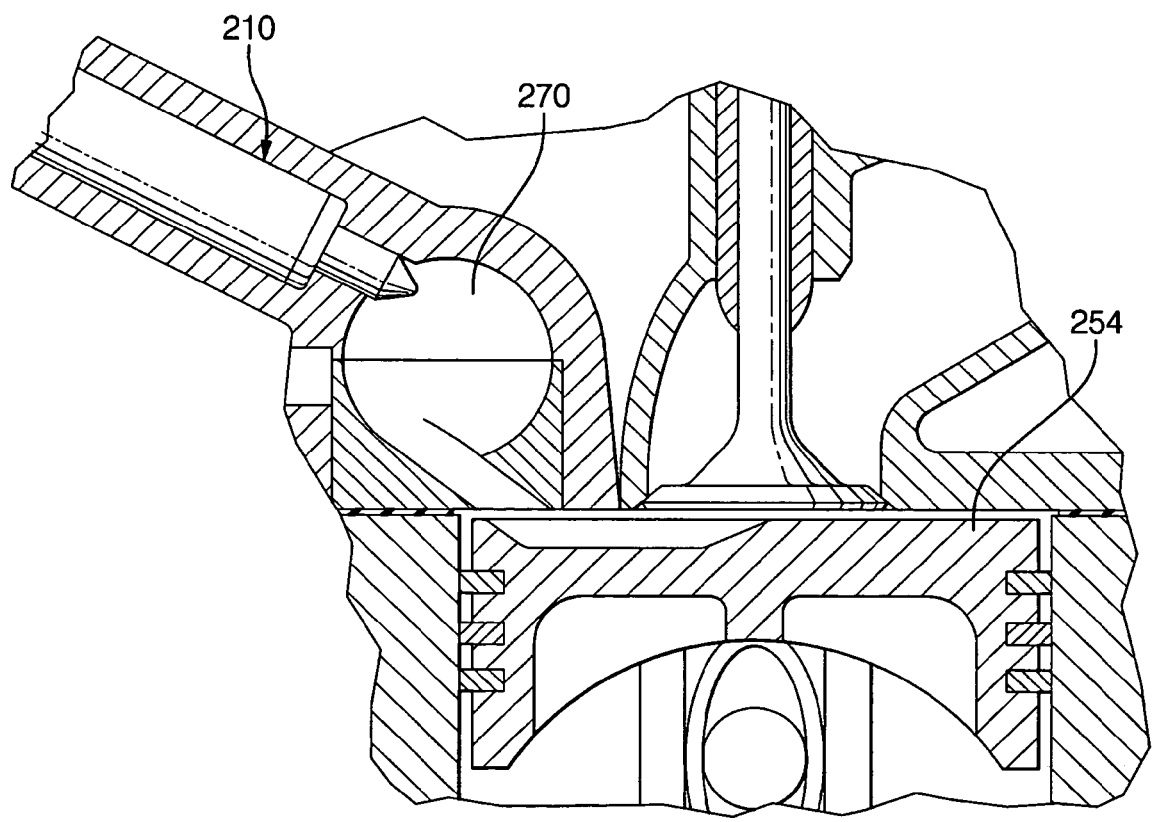
FIG. 10 is a cross-sectional view of an engine employing an indirect injection system.
Figure 12:
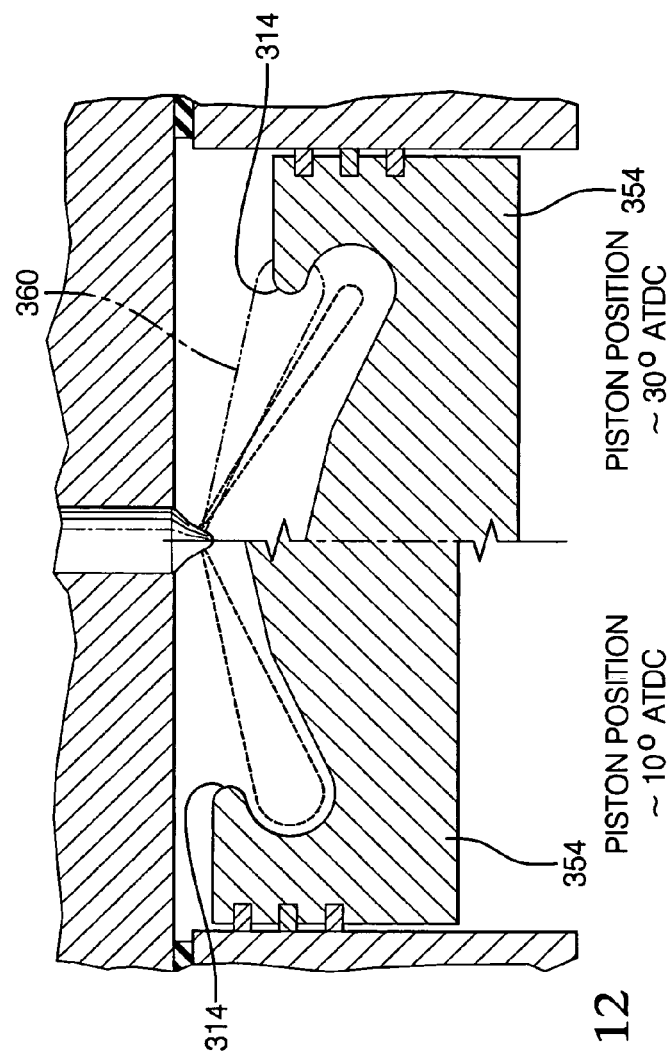
FIG. 12 is a split figure showing a main injection on the left hand side and an auxiliary spray only on the right hand side.
Figure 13:
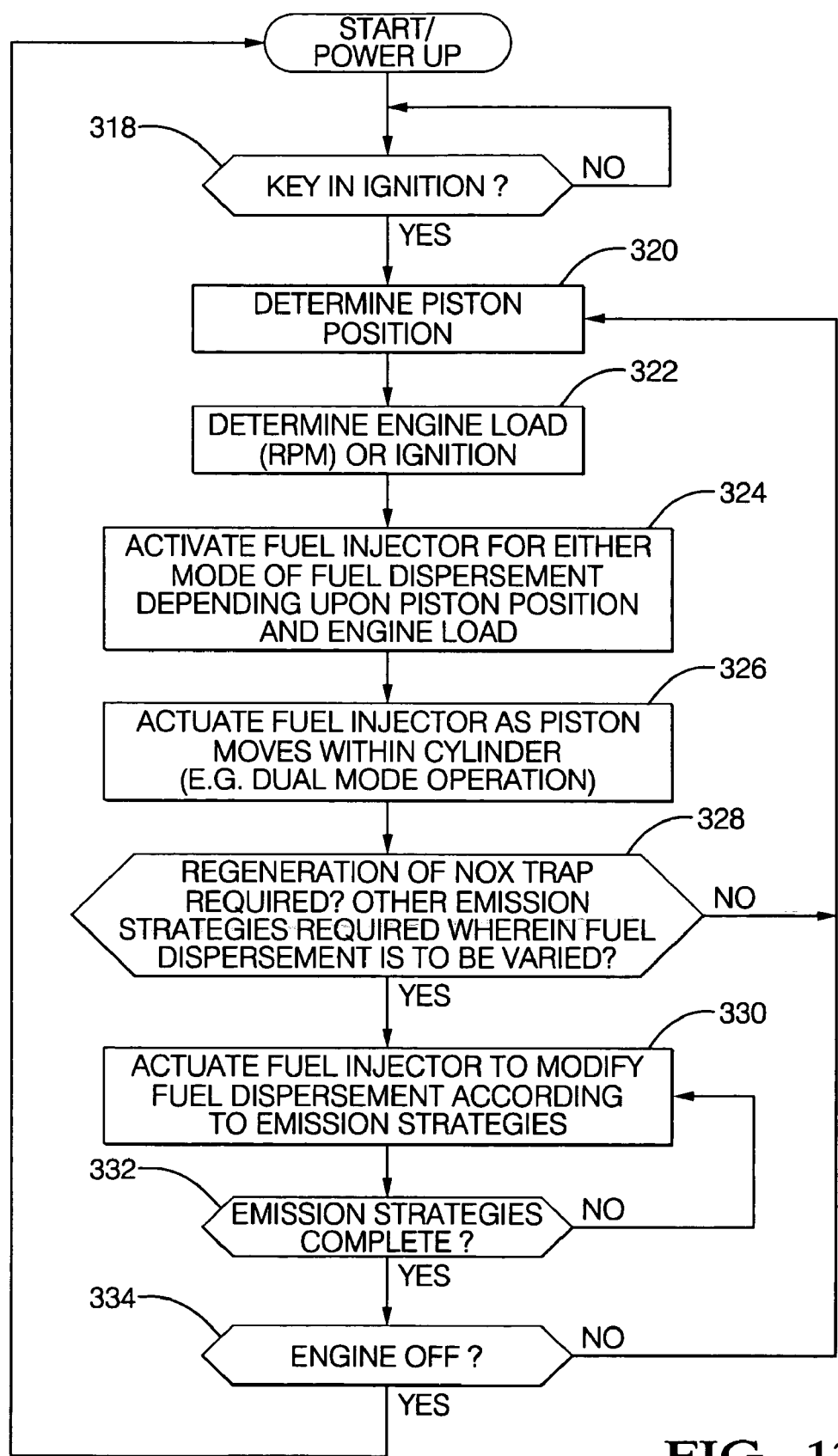
FIG. 13 is a flow chart illustrating portions of a control algorithm employing fuel injector control strategies of exemplary embodiments of the present invention.

A typical modern DI (direct injection) engine has a central vertical injector spraying into a re-entrant toroidal cavity in the piston crown that closely matches the spray plume shape (e.g., FIGS. 8, 9 and 13). Thus, spray targeting is an important variable. Piston velocity around TDC is low, and thus the effect of changing chamber geometry by virtue of piston motion is small until around the time of end-of-injection by which time piston velocity is increasing. Accordingly, an injector spray pattern that is optimized for the extended period that the combustion chamber is almost static around TDC has problems as the piston moves away from TDC. Typically, the fixed geometry of a conventional nozzle results in the later parcels of injected fuel impinging on the re-entrant lip of the piston bowl, which in turn impairs and prolongs the mixing process and thus degrades combustion. The readily predicted result of this situation is high smoke and HC emissions. For example, and referring now to FIG. 12, and if the fuel injector nozzle was incapable of providing a variable plume, wherein the plume is only configured for main injection (e.g., 10 degrees after top dead center ATDC i.e., the left side of FIG. 12) the plume 360 illustrated by the dashed lines on the right side of FIG. 12 will impinge upon the entrant lip of the piston bowl as the piston moves further away from TDC.

Unfortunately, the diffusion mixing process of the compression ignition cycle results in high local in-cylinder temperatures that promote the formation of $NO_2$ and NO(NOx), and a standard countermeasure regularly taken to minimize NOx emissions is to retard injection timing closer to TDC (e.g., beginning the dispersement closer to TDC), which has the beneficial effect of lowering said temperatures. A recognized side effect of retarding the injection timing is to aggravate the problem of fuel impingement on the re-entrant lip since now the piston is increasing its velocity on the expansion stroke when the later fuel parcels arrive (e.g., plume 360). Thus, a measure taken to minimize one pollutant has a deleterious effect on another with little overall gain.

In a more ideal combustion system the targeting of the injection spray plumes would follow the changing location of the combustion chamber as it moves for whatever reason. This movement or location of the piston is easily determined as the rotation and position of a crank shaft of the engine can be determined by a sensor or sensing device associated with the crank shaft thus, movement, speed and location of the piston is known. Non-limiting methods of determining movement, speed and location of the piston are found in the following U.S. Pat. Nos. 6,679,225; 6,679108; 6,640,621; 6,308,671; and 6,752,009 and EP patent applications EP1275953 and EP1050676, the contents of which are incorporated herein by reference thereto. Accordingly, an appropriate signal can be sent to a microprocessor containing a control algorithm for varying the dual mode fuel injector to provide a variable plume according to the position of the piston. It is hereby recognized that this ideal combustion system can be approached with the Mode-Switching Nozzle of exemplary embodiments of the present invention, and a unique injection strategy is enabled thereby. Exemplary embodiments of the present invention are directed to a two-row Variable Orifice Nozzle in combination with colliding sprays in such a manner that a mode switching nozzle is enabled.

As disclosed in exemplary embodiments, the first (upper) row of holes may be used independently of the second (lower) row of holes, and their targeting is different from that of the lower holes, but when injection is required from the lower holes, the upper holes must inject too; however their plumes are subsumed through a collision mechanism external to the nozzle, into the main spray emanating from the lower holes. This effect permits the first spray holes to be targeted to an area which is appropriate when the piston is some way down the bore, but inappropriate for TDC injection.

A multiple injection strategy today for a well-developed diesel engine might involve an early pilot, a close pilot, a main, a close post, and a late post injection. Looking at this in more detail and assuming the use of a conventional fixed geometry nozzle optimized for the main injection, the pilot and post injections of small quantities of fuel will be neither optimized for targeting or orifice size, as is indicated in the chart below.

|  | Early Pilot | Close Pilot | Main Injection | Close Post | Late Post |
| --- | --- | --- | --- | --- | --- |
| Spray Targeting | No | OK? | Yes | OK? | No |
| Optimum Orifice Size | No | No | Yes | No | No |

As illustrated, only the spray targeting and orifice size is optimized at main injection. Thus, the problems of spray plume 360 are encountered if the injection timing is retarded.

If we now examine the same criteria using the mode-switching nozzle, we get the results shown in chart below, which indicates that both the spray targeting and the hole flow area is near optimum.

|  | Early Pilot | Close Pilot | Main Injection | Close Post | Late Post |
| --- | --- | --- | --- | --- | --- |
| Spray Targeting | Yes | Yes | Yes | Yes | Yes |
| Optimum Orifice Size | Yes | Yes | Yes | Yes | Yes |

Figure 11:
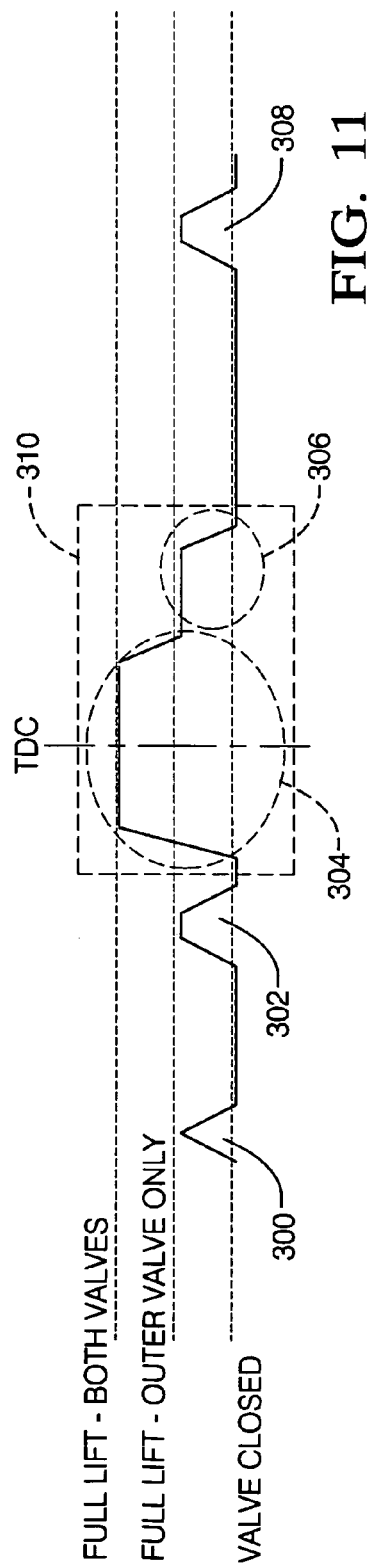
FIG. 11 is a graph illustrating fuel injector lift versus time for various fuel dispersements.

Therefore, the mode-switching nozzle is unique in this respect, as it enables a unique strategy, which is shown in FIG. 11 and described herein. FIG. 11 illustrates the fuel injector lift vs. time for several injections. FIG. 11 illustrates two pilot injections (300 and 302), a main injection 304, and two post injections (306 and 308), which may relate to exhaust gas after treatment or emission control strategies.

It is understood that FIG. 11 represents a non-limiting example of exemplary embodiments of the present invention and that numerous other types of injections and strategies are available. Here the main injection occurs before and after top dead center position of the piston. Accordingly, the fuel injector needle plumes are configured to correspond with the piston position as well as required operation (e.g., EGA or load requirements). For example, the main injection will correspond to the piston position illustrated by the left-hand side of FIG. 12 while the post injections (306 and 308) will correspond to the piston position illustrated by the right hand side of FIG. 12. Similarly, the pilot injections 300 and 302 will correspond to a similar piston position, which is before top dead center. As discussed herein it is contemplated that the main injection will occur in a range of about 15 crank degrees before and after top dead center. However, and as applications may require (e.g., engine specifications as well as engine load), the main injection may occur in crank degree ranges greater or less than aforementioned 30 degrees. In addition, the crank degree range of the main injection may be shifted before and after top dead center (e.g., 20 degrees before and 10 degrees after or 10 degrees before and 20 degrees after or as discussed above may encompass ranges greater or less than 30 crank degrees). As used herein crank degrees refers to rotation of the crank-shaft, which relates to piston position with respect to top dead center as is known in the related arts.

FIG. 11 illustrates an "attached post" or "trailing boot" injection, which is illustrated by the dashed lines 310. This "attached post" or "trailing boot" injection follows the main injection event that is normally constrained to end when the piston re-entrant lip interferes with the spray plume. In accordance with an exemplary embodiment and as illustrated in FIGS. 11 and 12, the injection at the point of "attached post" or "trailing boot" injection transitions to the first row of holes only with its narrow-angle targeting (right hand side of FIG. 12). This strategy is expected to provide combustion and therefore emission benefit from improved atomization due to the more nearly optimum nozzle flow area, lower smoke emission since the narrower spray plume targeting no longer interferes with the piston lip, and lower NOx emissions since the injection can be extended later and longer than is normal thus resulting in lower in-cylinder temperatures. This later and longer injection is facilitated through the plumes or fuel dispersement arrangements corresponding to the upper row of openings, which prevents impingement upon the re-entrant bowl lip.

In contrast, if the plume on the left-hand side of FIG. 12 were only available it would interfere with the entrant lip 314 of piston 354 as it moves from 10 degrees after top dead center (left side) to 30 degrees after top dead center (right side); a non-limiting example of this interference is shown by a plume 360 thus, if only this plume or fuel dispersement arrangement were available the injection would not be able to occur in the later stages of piston movement after top dead center.

Thus, additional benefits are provided as the interference from the piston bowl lip is avoided. FIGS. 11 and 13 illustrate this "trailing boot" concept. It is also understood that, a "boot-main-boot" strategy is also possible, wherein fuel is dispersed through the upper row of holes before and after the main injection. Such strategies used with the "mode-switching nozzle" of exemplary embodiments of the present invention will provide combustion and emission benefits not previously available.

Referring now to FIG. 13 portions of a control algorithm for use with exemplary embodiments of present invention is illustrated. In accordance with an exemplary embodiment the control algorithm represents machine readable code resident upon a microprocessor or other equivalent device of an engine control module. As used herein each step or query represents machine-readable code capable of providing outputs or signals for use in subsequent steps, wherein the code or steps respond to signals from sensors or devices positioned to provide inputs to the control algorithm (e.g., piston position, engine RPM, etc.).

As illustrated, a first step 318 determines if the engine is about to be started by for example, determining if the key has been inserted into an ignition activating device. If so, the algorithm will advance to a step 320 wherein the piston position of each cylinder of the engine is determined. Thereafter, a step 322 will determine the anticipated or existing engine load, which can be determined by the RPM of the engine as well as fuel requirements as the engine is running. This information is readily available to existing control systems through existing sensing and control systems thus, appropriate signals can be provided to a controller and the fuel injector control algorithm in accordance with exemplary embodiments of the present invention.

Alternatively, a step 322 may be required to determine whether the engine has been started or ignition of the engine has occurred. Once the engine has been started and is running, signals relating to cylinder position (e.g., before or after top dead center) and engine load or fuel requirements are provided to the control algorithm controlling actuation of the fuel injector in accordance with exemplary embodiments of present invention.

At step 324, a determination is made for the appropriate mode or disbursement from the fuel injector nozzle depending upon piston position and engine load. In order to vary the fuel disbursement a signal is sent to the actuator 23 for moving the inner and outer sleeves of the fuel injector nozzle in order to provide the varying plumes as illustrated in FIGS. 1-12. This actuation of the fuel injector as the piston moves within the cylinder is illustrated by step 326, which monitors piston speed as well as position and engine RPM as well as any other appropriate signal for use in fuel control strategies. Moreover, piston speed and therefore variations of the actuation of the fuel injector are adapted as the engine requirements vary through usage.

In addition, the control algorithm will also comprise a series of instructions for determining whether or not an emission strategy is required wherein the fuel disbursement of the fuel injector is to be varied to accommodate spray plumes with regard to piston position that may be outside the scope of normal operation (e.g., engine combustion), this step is represented by boxes 328 and 330. An example of such an emissions strategy would be for a post injection wherein fuel is dispersed into the cylinder for regeneration of the NOx absorber. Of course, other emission control strategies are contemplated for use with exemplary embodiments of the present invention. Once the emission control strategies are complete (steps 328 and 330) the system will continuously cycle through steps 320 through 332 until it has determined that the engine has been shut off (step 334). It is, of course, understood that the control algorithm illustrated by FIG. 13 is merely a non-limiting example of an exemplary embodiment and numerous variations thereof are contemplated to be within the scope of the claims of the present invention.

As discussed, herein the term "engine" is meant in the broad sense to include all combustors which combust hydrocarbon fuels to provide heat, e.g., for direct or indirect conversion to mechanical or electrical energy. Internal combustion engines of the Otto, Diesel and turbine types, as well as burners and furnaces, are included and can benefit from the invention. The diesel engine is in this description for purposes of providing an example. Stationary and mobile engines are also contemplated to be within the scope of exemplary embodiments of the present invention.

The term "Diesel engine" includes all compression-ignition engines, for both mobile (including marine) and stationary power plants and of the two-stroke per cycle, four-stroke per cycle or other plurality of strokes, and rotary types. The term "hydrocarbon fuel" includes all fuels prepared from "distillate fuels" or "petroleum" (e.g., gasoline, jet fuel, diesel fuel, and various other distillate fuels). The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", and "third" and the like may be used herein to modify elements performing similar and/or analogous functions. These modifiers do not imply a spatial, sequential, or hierarchical order to the modified elements unless specifically stated.

What is claimed is:

1. A fuel injector nozzle for dispersing fuel before, during and after a piston of an engine reaches top dead center, the fuel injector nozzle comprising:
    a plurality of first outlet openings configured to disperse fuel in a first plume that is configured to be received within a re-entrant bowl of the piston while the piston is at a position greater than 15 degrees before top dead center and 15 degrees after top dead center, wherein the first plume will not impinge upon a lip of the re-entrant bowl; and
    a plurality of second outlet openings configured to disperse fuel in a second plume that is configured to be received within the re-entrant bowl of the piston while the piston is at a position less than 15 degrees before top dead center and 15 degrees after top dead center, wherein the second plume will not impinge upon the lip of the re-entrant bowl; wherein fuel dispersed from the plurality of second outlet openings collides with fuel dispersed from the a plurality of first outlet openings.

2. The fuel injector nozzle as in claim 1, wherein the plurality of first outlet openings are smaller than the plurality of second outlet openings.

3. The fuel injector nozzle as in claim 2, wherein the plurality of first outlet openings are disposed within the fuel injector nozzle with a first angular configuration and the plurality of second outlet openings are disposed within the fuel injector nozzle with a second angular configuration.

4. The fuel injector nozzle as in claim 3, wherein the plurality of first outlet openings are disposed above the plurality of second outlet openings.

5. The fuel injector nozzle as in claim 1, wherein the plurality of first outlet openings are disposed within the fuel injector nozzle with a first angular configuration and the plurality of second outlet openings are disposed within the fuel injector nozzle with a second angular configuration and a greater number of the plurality of second outlet openings are positioned in the fuel injector nozzle than the plurality of second outlet openings and only a portion of the plurality of the second outlet openings are configured to cause fuel from the plurality of second outlet openings to collide with fuel dispersed from the plurality of first outlet openings.

6. The fuel injector nozzle as in claim 5, wherein the plurality of first outlet openings are disposed above the plurality of second outlet openings.

7. The fuel injector nozzle as in claim 6, wherein the plurality of first outlet openings are smaller than the plurality of second outlet openings.

8. The fuel injector nozzle as in claim 1, wherein the plurality of first outlet openings only disperse fuel when a valve needle of the fuel injector nozzle is moved a first distance and the plurality of second outlet openings only disperse fuel when the valve needle moves a second distance, the second distance being further than the first distance.

9. The fuel injector nozzle as in claim 8, wherein the plurality of first outlet openings are smaller than the plurality of second outlet openings.

10. The fuel injector nozzle as in claim 8, wherein the plurality of first outlet openings are disposed within the fuel injector nozzle with a first angular configuration and the plurality of second outlet openings are disposed within the fuel injector nozzle with a second angular configuration.

11. A fuel injector nozzle for dispersing fuel in a cylinder of an internal combustion engine, when the cylinder is at or about top dead center and at or about bottom dead center, the cylinder having a re-entrant bowl with a lip, the fuel injector nozzle comprising:
    a plurality of first outlet openings configured to disperse fuel when the cylinder is at or about bottom dead center and when the cylinder is at or about top dead center;
    a plurality of second outlet openings configured to disperse fuel only when the cylinder is at or about top dead center, wherein fuel dispersed from the plurality of second outlet openings collides with fuel dispersed from the plurality of first outlet openings; and
    wherein the fuel injector nozzle is configured to provide a first fuel dispersement arrangement and a second fuel dispersement arrangement each of which is configured to avoid impingement upon the lip of the re-entrant bowl of the piston.

12. The fuel injector nozzle as in claim 11, wherein the plurality of first outlet openings are smaller than the plurality of second outlet openings.

13. The fuel injector nozzle as in claim 12, wherein the plurality of first outlet openings are disposed within the fuel injector nozzle with a first angular configuration and the plurality of second outlet openings are disposed within the fuel injector nozzle with a second angular configuration.

14. The fuel injector nozzle as in claim 13, wherein the plurality of first outlet openings are disposed above the plurality of second outlet openings.

15. The fuel injector nozzle as in claim 11, wherein the plurality of first outlet openings are disposed within the fuel injector nozzle with a first angular configuration and the plurality of second outlet openings are disposed within the fuel injector nozzle with a second angular configuration.

16. The fuel injector nozzle as in claim 15, wherein the plurality of first outlet openings are disposed above the plurality of second outlet openings.

17. The fuel injector nozzle as in claim 16, wherein the plurality of first outlet openings are smaller than the plurality of second outlet openings.

18. A method for providing variable fuel dispersal through a fuel injector nozzle, comprising:
    determining a position of a piston of an engine;

providing fuel to either a first plurality of openings in an outer housing of the fuel injector nozzle or the first plurality of openings and a second plurality of openings in the outer housing of the fuel injector nozzle, the second plurality of openings being disposed below the first plurality of openings and the second plurality of openings are larger than the first plurality of openings such that a larger amount of fuel is allowed to flow therethrough and collide with fuel provided to the first plurality of openings by moving an outer needle of the fuel injector from a first position to a second position or by moving the outer needle between the first position and a third position, wherein the third position is further away from the first position than the second position, wherein movement of the outer needle is dependent upon the position of the piston.

19. The method as in claim 18, further comprising: determining a load of the engine, wherein movement of the outer needle is dependent upon the position of the piston and the load of the engine.

20. The method as in claim 18, further comprising: determining whether an emission control strategy is to be employed, wherein movement of the outer needle is dependent upon the position of the piston and whether an emission control strategy is to be employed.

21. A storage medium encoded with a machine-readable computer program code for a method of providing variable fuel dispersal through a fuel injector nozzle the method comprising:

determining a position of a piston of an engine;

providing fuel to either a first plurality of openings in an outer housing of the fuel injector nozzle or the first plurality of openings and a second plurality of openings in the outer housing of the fuel injector nozzle, the second plurality of openings being disposed below the first plurality of openings and the second plurality of openings are larger than the first plurality of openings such that a larger amount of fuel is allowed to flow therethrough and collide with fuel provided to the first plurality of openings by moving an outer needle of the fuel injector from a first position to a second position or by moving the outer needle between the limit position and a third position, wherein the third position is further away from the first position than the second position, wherein movement of the outer needle is dependent upon the position of the piston.

22. A fuel injector nozzle for dispersing fuel before, during and after a piston of an engine reaches top dead center, the fuel injector nozzle comprising:

a plurality of first outlet openings configured to disperse fuel in a first plume that is configured to be received within a re-entrant bowl of the piston while the piston is traveling within a range of motion including a first position before top dead center and a second position after top dead center, wherein the first plume will not impinge upon a lip of the re-entrant bowl; and a plurality of second outlet openings configured to disperse fuel in a second plume that is configured to be received within the re-entrant bowl of the piston while the piston is at a position not within the range of motion, wherein the second plume will not impinge upon the lip of the re-entrant bowl; wherein fuel dispersed from the plurality of second outlet openings collides with fuel dispersed from the plurality of first outlet openings.

23. The fuel injector nozzle as in claim 22, wherein the range of motion includes a range of 20-30 crank degrees about top dead center.

24. The fuel injector nozzle as in claim 23, wherein the range of motion is unevenly dispersed about top dead center.

25. The fuel injector nozzle as in claim 23, wherein the range of motion includes less than 20 crank degrees about top dead center.

26. The fuel injector nozzle as in claim 25, wherein the range of motion is unevenly dispersed about top dead center.

27. The fuel injector nozzle as in claim 22, wherein the range of motion includes 30-50 crank degrees about top dead center.

28. The fuel injector nozzle as in claim 23, wherein the plurality of first outlet openings are disposed within the fuel injector nozzle with a first angular configuration and the plurality of second outlet openings are disposed within the fuel injector nozzle with a second angular configuration and a greater number of the plurality of second outlet openings are positioned in the fuel injector-nozzle than the plurality of second outlet openings and only a portion of the plurality of the second outlet openings are configured to cause fuel from the plurality of second outlet openings to collide with fuel dispersed from the plurality of first outlet openings.

29. The fuel injector nozzle as in claim 28, wherein the plurality of first outlet openings are smaller than the plurality of second outlet openings and the plurality of first outlet openings are disposed above the plurality of second outlet openings.

* * * * *